(12) United States Patent
Faber et al.

(10) Patent No.: US 6,555,492 B2
(45) Date of Patent: Apr. 29, 2003

(54) ZEOLITE/ALUMINA CATALYST SUPPORT COMPOSITIONS AND METHOD OF MAKING THE SAME

(75) Inventors: Margaret K. Faber, Corning, NY (US); Larry D. Gorges, Corning, NY (US); Steven B. Ogunwumi, Corning, NY (US)

(73) Assignee: Corning Incorporated, Corning, NY (US)

( * ) Notice: Subject to any disclaimer, the term of this patent is extended or adjusted under 35 U.S.C. 154(b) by 164 days.

(21) Appl. No.: 09/727,281

(22) Filed: Nov. 30, 2000

(65) Prior Publication Data

US 2002/0094932 A1 Jul. 18, 2002

Related U.S. Application Data

(60) Provisional application No. 60/173,597, filed on Dec. 29, 1999.

(51) Int. Cl.$^7$ .......................... B01J 29/06; B01J 29/072
(52) U.S. Cl. ........................ 502/65; 502/64; 502/66; 502/73; 502/74
(58) Field of Search ..................... 502/64, 65, 66, 502/73, 74, 303, 304, 324, 340, 341, 344, 349, 350, 355

(56) References Cited

U.S. PATENT DOCUMENTS

| | | | |
|---|---|---|---|
| 4,631,267 A | | 12/1986 | Lachman et al. |
| 4,631,268 A | | 12/1986 | Lachman et al. |
| 4,631,269 A | | 12/1986 | Lachman et al. |
| 4,637,995 A | | 1/1987 | DeAngelis et al. |
| 4,657,880 A | | 4/1987 | Lachman et al. |
| 4,888,317 A | | 12/1989 | DeAngelis et al. |
| 5,206,196 A | | 4/1993 | Nakano et al. |
| 5,208,198 A | * | 5/1993 | Nakano et al. ............... 502/66 |
| 5,212,130 A | * | 5/1993 | Addiego et al. ......... 423/213.5 |
| 5,433,933 A | | 7/1995 | Eshita et al. |
| 5,565,394 A | | 10/1996 | Lachman et al. |
| 5,792,436 A | * | 8/1998 | Feeley et al. ............... 423/210 |
| 5,985,225 A | | 11/1999 | Ohtsuka et al. |
| 5,993,764 A | * | 11/1999 | Tabata et al. ............. 423/213.5 |

FOREIGN PATENT DOCUMENTS

| | | | |
|---|---|---|---|
| JP | 63-283727 | | 11/1988 |
| JP | 1-130735 | | 5/1989 |
| JP | 4-197447 | * | 9/1992 |
| JP | 5-184934 | | 7/1993 |
| JP | 7-328448 | * | 12/1995 |
| JP | 2000-51704 | * | 2/2000 |
| WO | 94/19427 | | 9/1994 |
| WO | 94/27709 | | 12/1994 |
| WO | WO 96/33004 | * | 10/1996 |
| WO | 98/45582 | | 10/1998 |

* cited by examiner

*Primary Examiner*—Tom Dunn
*Assistant Examiner*—Christina Ildebrando
(74) *Attorney, Agent, or Firm*—Kees van der Steere; Timothy M. Schaeberle

(57) ABSTRACT

A catalyst for purifying an exhaust gas to remove nitrogen oxides, carbon monoxide and hydrocarbons from exhaust gas comprising a zeolite having a silica/alumina molar ratio of greater than 55, and at least 1.5%, by weight, each of nickel and cobalt incorporated therein. A second embodiment of the is an adsorber catalyst system for use in the removal of the oxides of nitrogen from waste gas, the adsorber/catalyst system comprising the following components: (1) a zeolite having a silica/alumina ratio of greater than 55; (2) at least 1.5%, by weight, each of nickel and cobalt incorporated therein; and, (3) an adsorber component comprising a mixture of gamma alumina support and a adsorber material selected from the group consisting of metal oxides, metal hydroxides, metal carbonates and mixed metal oxides.

8 Claims, 2 Drawing Sheets

ZEOLITE/ALUMINA CATALYST SUPPORT COMPOSITIONS AND METHOD OF MAKING THE SAME

This application claims the benefit of U.S. Provisional Application No. 60/173,597, filed Dec. 29, 1999, entitled "Zeolite/Alumina Catalyst Support Compositions and Method of Making the Same", by Faber et al.

BACKGROUND OF THE INVENTION

1. Field of the Invention

The present invention relates to a catalyst for purifying an exhaust gas to remove nitrogen oxides, carbon monoxide and hydrocarbons contained in an exhaust gas discharged, for example, from internal combustion engines of automobiles. More specifically, it relates to a catalyst for removing nitrogen oxides contained in an oxygen-rich exhaust gas. Additionally, this invention relates to an adsorber/catalyst for removing nitrogen oxides contained in an oxygen-rich exhaust gas.

2. Background and Discussion of the Related Art

Air pollution due to nitrogen oxide (NO) and nitrous oxide ($N_2O$) poses serious environmental problems. Whereas, nitrogen oxides have been implicated in acid rain and smog formation, $NO_2$ is a greenhouse gas that contributes to the catalytic destruction of stratospheric ozone. As a result, abating these gases (NO and $N_2O$) has become a matter of urgent environmental concern.

Anthropogenic activities appear to be largely responsible for the increased level of NO and $N_2O$ observed in the atmosphere. The reason being, both gases are emissions from automobile exhaust and several chemical processes. Nitrogen oxides, carbon monoxide and hydrocarbons, contained in an exhaust gas discharged from internal combustion engines, are removed, for example, through the use of a three-way catalyst comprising Pt, Rh, Pd, etc., supported on a carrier material. In the case of an exhaust gas discharged from diesel engines, however, no effective catalyst exists for removing nitrogen oxides due to the large amount of oxygen in the exhaust gas, a condition under which the typical TWC becomes inefficient. As such, purification of the exhaust gas by a TWC catalyst is not practical.

Recently lean-burn combustion gasoline engines have been utilized in an attempt to lower the fuel consumption and reduce the amount of exhausted carbon dioxide gas. However, exhaust gas from lean burn gasoline engines typically exhibit an atmosphere containing an excessive amount of oxygen, and thus again the utilization of the conventional three-way catalyst, is impractical.

One current technology that has been utilized to remove undesired nitrogen oxide pollutants from lean burning gasoline engines and diesel engines involves the use of adsorbers comprising cordierite honeycomb containing γ-alumina supported washcoat materials, in combination with the cycling of the engine between lean and rich burn conditions. Typically, these adsorbers consist of base metal oxides in combination with precious metals such as Pt. The mechanism of removal involves the adsorbed nitric oxide being oxidized to $NO_2$ by the Pt catalyst during the lean operation of the vehicle. Subsequently, the nitrogen dioxide is chemically adsorbed on the base metal oxides to form solid nitrates. In order to regenerate the base metal oxide catalysts and to convert the by-products of the reaction to $N_2$ rather than to undesirable nitrogen oxide species, the engine management system programs a rich cycle during which the nitrate salts release $NO_2$ which is reacted over the Pt catalyst in the presence of excess reducing agents (excess hydrocarbons, CO, and $H_2$) to form $N_2$, $H_2O$, and $CO_2$. Although the use of NO adsorbers in a lean-rich cycle for diesel and lean burn gasoline engines has been demonstrated to increased NO conversions to $N_2$, over a temperature range of about 250° C. to 475° C., this approach does have some drawbacks. Specifically, the following: (1) the rich cycle adversely affect the drivability for diesel engines and involves subjecting the engine to a fuel penalty; (2) the base metal oxide NO adsorbers are poisoned by $SO_2$ and must be regenerated in a rich cycle.

Another approach to controlling nitrogen oxide emissions, has been the use of Cu-ZSM-5 zeolite catalysts. Although these catalysts have demonstrated adequate conversions of NO to $N_2$, these catalysts typically suffer decreased conversion of NO as a result of aging in atmospheres having levels of steam in the 10–12% range found in combustion exhaust gas. Furthermore, even though zeolite catalysts are preferred over base metal oxide adsorbers, due to their direct conversion of NO to nitrogen and greater $SO_2$ tolerance, these zeolite catalysts still result in a fuel penalty that is necessary to achieve in the aforementioned NO conversion.

One solution to the aforementioned excess oxygen problem, set forth in Japanese Unexamined Patent Publication (Kokai) Nos. 63-283727 and 1-130735, involves zeolite catalysts subjected to an ion exchange with a transition metal. These materials are capable of removing nitrogen oxides in an exhaust gas containing an excessive amount of oxygen without the addition of a special reducing agent such as ammonia. Specifically, these references propose a catalyst that can selectively reduce nitrogen oxides even in an exhaust gas containing an excessive amount of oxygen and can remove minor amounts of reducing agents such as unburnt carbon monoxide and hydrocarbons. While capable of removing nitrogen oxides, the ion-exchanged zeolites are subject to deterioration when used at a high temperature for a long time.

Accordingly, to solve the above-described problems, a catalyst for purifying an exhaust gas comprising a zeolite having an $SiO_2/Al_2O_3$ mole ratio of at least 15, and incorporated therein, cobalt and a rare earth metal has been proposed (see Japanese Patent Application No. 2-149203). Although the exhaust gas purification catalyst proposed in Japanese Patent Application No. 2-149203 has an improved durability, the temperature region in which the nitrogen oxides can be removed is relatively narrow.

Lastly, U.S. Pat. No. 5,206,196 discloses an catalyst for removing nitrogen oxides from an oxygen-rich exhaust gas comprising a zeolite having a $SiO_2/Al_2O_3$ ratio of at least 15 with a combination of a cobalt, a rare earth metal and silver incorporated in the zeolite. Although this catalyst capably removes nitrogen oxides from an oxygen-rich exhaust gas, the preparation of these materials is complex and expensive as a result of the incorporation of silver into the zeolite catalyst There is, accordingly, a clear need for, and thus an object of the present invention is to provide, a catalyst capable sufficiently removing nitrogen oxides from an oxygen-rich exhaust gas without requiring complex and expensive formation procedures.

SUMMARY OF THE INVENTION

Accordingly, the object of the present invention is to solve the above problems of the prior art and to provide for a catalyst for removing nitrogen oxides from an oxygen-rich exhaust gas that is durable, exhibits high conversion activity and is relatively simple and inexpensive to produce.

Specifically, the invention is directed at a catalyst for purifying an exhaust gas to remove nitrogen oxides, carbon monoxide and hydrocarbons from exhaust gas comprising a zeolite having a silica/alumina molar ratio of greater than 55, and at least 1.5%, by weight, each of nickel and cobalt incorporated therein.

The invention is also directed at an adsorber/catalyst system for use in the removal of the oxides of nitrogen from waste gas, the adsorber/catalyst system comprising the following components: (1) a zeolite having a silica/alumina ratio of greater than 55; (2) at least 1.5%, by weight, each of nickel and cobalt incorporated therein; and, (3) an adsorber component comprising a mixture of a gamma alumina support and an adsorber material selected from the group consisting of metal oxides, metal hydroxides, metal carbonates mixed metal oxides and pillared clays.

DETAILED DESCRIPTION OF THE INVENTION

Figure 1:
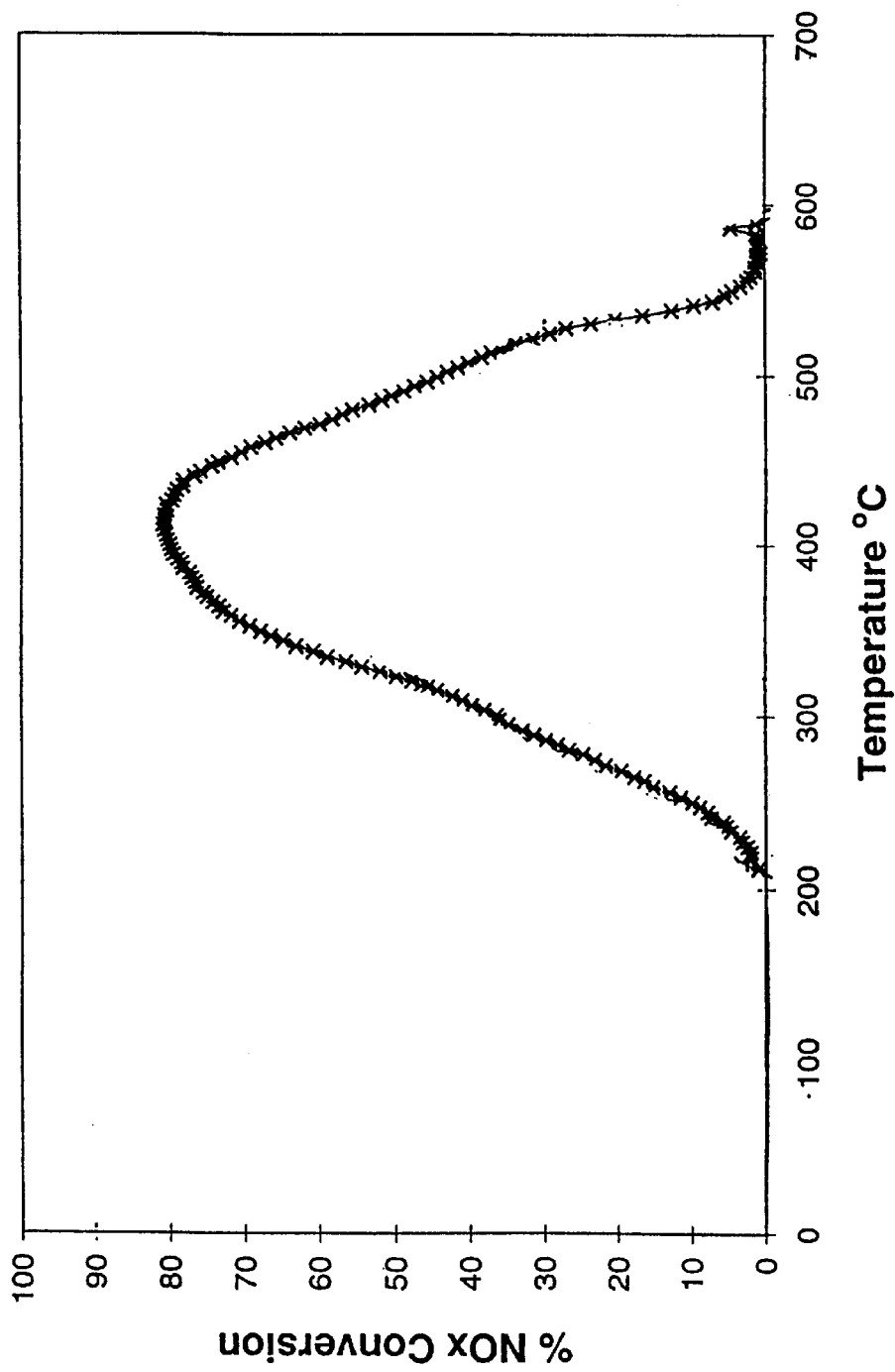
FIG. 1 is a graph illustrating a relation between the % NOx conversion and use temperature of the catalyst of Example 1.

The product of the present invention is a zeolite-based catalyst for removing nitrogen oxides from an oxygen-rich exhaust, specifically a catalyst wherein the zeolite exhibits a silica/alumina ratio of greater than 55, preferably at least 300, and having incorporated therein at least 1.5%, by weight, each of cobalt and nickel.

Typically, zeolites comprise large particles on the order of several microns and exhibit a regular array of accessible micropores, a combination that provides the high surface area attribute of zeolites; a feature that is retained by zeolites after sintering. Generally, such applications require substantial overall surface areas of at least 20 $m^2/g$, preferably greater than 100 $m^2/g$, and most preferably greater than 150–200 $m^2/g$. The inventive zeolite catalysts are capable of being extruded into a monolithic body, e.g., a honeycomb structure exhibiting at least 400 cells/in , exhibiting surface areas of at least 200 $m^2/g$, with surface areas in excess of 300 $m^2/g$ being readily attainable.

Advantages of this C—Ni impregnated catalyst include the following: (1) the catalyst exhibits high activity for $N_2O$ decomposition in a temperature range of 400–600° C., in the presence of 0–6% $O_2$ and, high stability in the presence of 10–12% $H_2O$; (2) the catalyst in its extruded form exhibits improved physical properties, specifically strength (MOR/Strength) in excess of 1500 psi; (3) the catalyst would be effective for promoting the elimination of CO and hydrocarbons present in the exhaust; these gases would serve as reductants.

The zeolite component of the composite is desirably a high silica-containing zeolite exhibiting a $SiO_2/Al_2O_3$ molar ratio of greater than 55, preferably 300. The high silica zeolite ensures that zeolite component exhibits thermal stability at those high temperatures typically seen in the exhaust environment. In other words, the high silica content of the zeolite provides the composite with the ability to maintain its structure at high temperatures. On the other hand, the presence of a low alumina content in the zeolite ensures that the zeolite will not experience the type of moisture problems typically associated with zeolites having high alumina content; high alumina zeolites typically de-aluminate in the presence of moisture at high temperatures. Furthermore, the zeolites crystalline silica phase is maintained at high temperatures and is responsible for the negative CTE characteristic that compensates to reduce the overall thermal expansion of the zeolite body.

Suitable zeolites include any silica-based zeolite having the requisite very high silica/alumina ratio. Useful high silica/alumina ratio-containing zeolites for the practice of the invention can be found among the zeolites selected from the following: mordenite, ultrastabilized Y (USY), ZSM-5, ZSM-8, ZSM-11, ZSM-12, Hyper Y, beta-zeolites, H-ferrierite, H-offretite, HL powder, faujasite, X zeolite, type L zeolite, mazzite, EMC-2, and combinations of these, preferably silicalite, and any of the natural zeolites including erionite, clinoptilolite, chanazite and phillipsite. One commercially available zeolite having the requisite high silica property is CBV 3002 available from the PQ Corporation.

There is no particular limitation of the method of incorporating the above-mentioned cobalt and nickel into the zeolite, and in general the cobalt and nickel can be incorporated by an ion-exchange method, an impregnation method, and an evaporation-to-dryness method through the use of a soluble salt. The cobalt and nickel may be incorporated separately or together. When incorporating the cobalt and nickel in the zeolite, the concentration of the individual cobalt and nickel metal ions in the aqueous solution, preferably nickel and cobalt acetate, can be properly selected so as to result in approximately 1.5% of the metal being incorporated into the zeolite.

The catalyst for purifying an exhaust gas according to the present invention may be used after impregnation with the cobalt and nickel metal, for example as in the formation of an extruded honeycomb catalyst body. Preferably, the zeolite is prepared in conventional manner and includes an amount of a permanent binder, for example silica or gamma alumina in the form of a boehmite. U.S. Pat. No. 4,631,267 to Lachman et al. discloses the conventional preparation of zeolite honeycombs comprising permanent silica binders by incorporating silicones in the batch mixture.

Prior to sintering the structure, the drying step is accomplished by placing the structure in an oven at a temperature in the range of 50 to 100° C., preferably, at a temperature in the range of 90 to 100° C. In a particularly preferred embodiment, the drying step is accomplished by placing the green structure in a dielectric oven for a period of time sufficient to form a crack-free, self-supporting structure. Preferably, the green body is dried in a dielectric oven for a period of no greater than 60 minutes, more preferably for a period of 5 to 30 minutes.

Regarding the temporary binders, methylcellulose, hydroxypropyl methylcellulose, and combinations thereof are especially preferred. Preferred sources of cellulose ethers and/or derivatives thereof, are Methocel A4M, F4M, and F240M from Dow Chemical Co. Methocel A4M is a methylcellulose binder having a gel temperature of 50–55° C. and gel strength of 5000 $g/cm^2$ (based on 2% solution at 65° C.). Methocel F4M and F240M are hydroxypropyl methylcellulose.

In a second embodiment the invention comprises a third component, an adsorber material added to the cobalt/nickel impregnated zeolite. This adsorber/catalyst system is capable of purifying an exhaust gas to remove nitrogen oxides, carbon monoxide and hydrocarbons from exhaust gas. Specifically this adsorber/catalyst comprises the aforementioned cobalt/nickel impregnated zeolite and an adsorber component comprising a mixture of gamma alumina support material and an adsorber material. Expressed in percent by weight, the adsorber catalyst, according to the invention, characteristically contains at least about 30%, and preferably 50–60%, zeolite.

Suitable adsorber materials include, but are not limited to, metal oxides, metal carbonates, metal hydroxides, mixed metal oxides, and pillared clays.

Suitable metals for the oxides, carbonates, and hydroxides include but are not limited to Group IA and Group IIA metals. Preferred of these metals are lithium, sodium, potassium, cesium, magnesium, calcium, strontium, and barium, most preferred are potassium and barium. Other preferred metals are lanthanum and manganese.

Examples of useful metal oxides are strontium oxide (SrO), barium oxide (BaO), calcium oxide (GaO), cesium oxide ($Cs_2O$), lithium oxide ($Li_2O$), lanthanum oxide ($La_2O_3$), potassium oxide ($K_2O$), magnesium oxide (MgO), manganese oxide ($MnO_2$), and sodium oxide ($Na_2O$). Preferred oxides include BaO and $K_2O$.

Examples of useful mixed oxides are $BaTiO_3$, $BaZrO_3$, $MnO_2$, $LaMnO_x$ (x ranging from 2 to 4), and perovskite and spinel type mixed oxides. Preferred perovskite materials include $BaMgCu_2O_6$ and $LaBaSrFe_2O_6$.

The presence of alumina provides the zeolite-based composite structure the support material function. Specifically the gamma alumina provides the necessary sites to enable binding of adsorber material to the structure, such that the composite will have enhanced adsorption activity and lifetimes over zeolite-only structures, when used in the harsh environments typically associated with exhaust gas. Additionally, the alumina, is porous enough and exhibits a high enough surface area to provide for the accessibility of the adsorber materials to the exhaust stream. Specifically, the high surface area gamma alumina ensures that the surface area of the composite will be significantly increased and be in the aforementioned range of 200 to, greater than, 300 $m^2/gm$.

Gamma alumina suitable for use in the formation of this composite include those aluminas that after calcining provide the requisite gamma alumina phase and exhibit a sufficiently high surface area suitable for functioning as the adsorber support material. A suitable commercially available gamma alumina having the requisite high surface area characteristic is GL-25 supplied by LaRoche Industries.

The alumina preferably may include an amount of stabilizing agent selected from the group consisting of lanthanum oxide ($La_2O_3$) or it equivalents, including barium oxide, strontium oxide and yttrium oxide. These stabilizing agents are known for stabilizing the specific surfaces of the alumina, which in its pure form is typically unstable at high temperatures. Specifically, the stabilizing agents inhibit the phase transformation of alumina at high temperatures, thereby increasing the high temperature stability of the alumina. The stabilizing agents are typically included in the alumina as a pre-dopant prior to the batching of the composite, and more preferably they are added to the composite after firing via an impregnation process.

A preferred stabilizing agent for the alumina is lanthanum oxide ($La_2O_3$), which is included by impregnation into the gamma alumina component of the composite. Lanthanum impregnation is such that the composite includes lanthanum oxide in the weight range of 0.5–20%, preferably 4–6%, with respect to the overall alumina amount. If lanthanum is added in an amount less than such range, then the beneficial effect of increase in activity due to the lanthanum addition is not observed.

Benefits exhibited by this inventive Co—Ni impregnated zeolite/adsorber body include the following. Firstly, the extruded body provides higher total volume of adsorber material than in is typically exhibited by those zeolite bodies comprising a washcoat, thereby leading to enhanced adsorption performance. Second the zeolite component performs a triple function in that: (1) it provides a negative CTE material that will lower the overall CTE of the integrated adsorber body; (2) the zeolite in the form of an intimate mixture with the adsorber material, and since the impregnated zeolite is itself a catalyst for the conversion of NO to $N_2$ the overall conversion percentage is likely increased, particularly when it is in close proximity to the adsorber material in the integrated extruded body; and, (3) the zeolite itself will adsorb some of the hydrocarbons, which, in turn, helps to reduce the desorbed NO to form $N_2$ during the rich part of any engine cycle, thereby reducing the amount of fuel penalty required to achieve a desirable conversion level of NO to nitrogen. Lastly, these integrated adsorber bodies, adsorber materials are extruded with zeolite and either silica or alumina binders, do not have chemical compatibility problems associated with conventional adsorbers that are washcoated on cordierite; problems such as the K and Ba may migrating into the cordierite, possibly increasing the overall CTE of the body.

EXAMPLES

To further illustrate the principles of the invention of the present invention, there will be described certain examples of zeolite catalysts formed according to the invention, as well as a comparative zeolite-based catalyst materials. However, it is to be understood that the examples are given for illustrative purpose only, and the invention is not limited thereto, but various modifications and changes may be made in the invention, without departing from the spirit of the invention.

Examples 1–5

Catalyst Preparation

Catalyst batches for each of the catalyst examples 1–5 were prepared in the following manner. A ZSM-5 zeolite (silica/alumina ratio of 55/1) was prepared in a conventional manner; a zeolite exhibiting a 80/20, by weight, zeolite/silica composition. Approximately 500 ml of water was placed in a mixer and 46.06 grams of nickel nitrate was added and the mixture was mixed until the nickel dissolved whereupon 45.93 grams of cobalt nitrate was added and the mixing continued until the cobalt was dissolved. 660 grams of the aforementioned zeolite was incrementally added (approximately 50–60 grams at a time) to the nitrate-cobalt solution with the increments being added after the previous addition was allowed to disperse; distilled water was added as needed to facilitate the mixing. After all the zeolite was added, the mixture was mixed for an additional 20 minutes. The resultant slurry was then placed into a crystallizing dish and the mixture was rinsed with water and thereafter placed in a dryer and dried at 60° C. until dry. The dried, impregnated zeolite was then placed into a container, along with alumina grinding media and the zeolite was then place on a Turbula mixer and mixed for 20 minutes to homogenize the mixture. After completion of homogenization the impregnated zeolite powder was then calcined at 600° C. for 3 hours in air; temperature ramped at a rate of 1° C./min. The calcined, impregnated zeolite powder was thereafter homogenized once more according to the above-mentioned procedure.

The impregnated zeolite powder was then combined with 48 grams of a methylcellulose temporary binder (Methocel A4M from the Dow Chemical Co.) and mixed in a Littleford dry blender after treatment with 2%, by weight, acetic acid (Aldrich Chemical Company Inc.). The mixed batch then was transferred to a muller and 350 (40%, by weight) millimeters of water was added to the batch to uniformly plasticize the batch.

Honeycomb bodies with a wall thickness of about 7 mil and 1 in. diameter and exhibiting 400 cells/in$^2$ were formed by extrusion of the plasticized batch through a ram extruder. The green extruded honeycombs were dried at 95° C. in a dielectric oven for a period of 20 minutes. After drying, the extruded honeycomb catalysts were fired in air at a temperature of 850° C. for a period of 3 hours. The compositions of the fired honeycomb catalysts of Examples 1–5 are reported in Table I.

The Example 4-honeycomb catalyst was subject to aging involving exposing the honeycomb to an atmosphere of 3% water for a period of 16 hours.

The honeycomb samples were tested for certain mechanical properties, including MOR, strength and surface area. The results indicated that the inventive extruded honeycomb Ni/Co impregnated zeolite catalysts exhibited MOR values and strength, both exceeding 1800 psi and surface areas in excess of 300 m$^2$/g.

Catalytic Activity Testing Procedure

The honeycomb catalysts were next tested for catalytic activity in conventional stainless steel tube reactor located within a split-tube furnace with a simulated exhaust gas mixture; the analysis of the gas being performed at the inlet and the outlet. The gas mixture consisted of 6% $O_2$, 14% $CO_2$, 220 ppm $C_3H_6$, 400 ppm $C_3H_8$, 1% CO, 500 NOx, 350 ppm CO, 10–12% $H_2O$ with the balance being nitrogen. The space velocity of the catalytic reaction was varied from 5,000 (1073 ml/mn) to 20,000 h$^{-1}$ by adjusting the feed flow rates of the gas mixture. The temperature of the reactor was raised 8.5° C./min between the temperature of 60° C. up to the final temperature of 600° C. and the temperature was maintained at this maximum temperature for 75 minutes. The NOx conversion was determined by utilizing the following equation:

NOx Conversion(%)=((NOx$_I$−NOx$_O$)/NOx$_I$)×100

Wherein NOx$_I$ is the NOx concentration at the inlet of the tube reactor and NOx$_O$ is the concentration at the outlet of the tube reactor; $NO_2$ conversions were calculated according to the same formula with $NO_2$ substituted for NOx.

The catalytic activity results, including the space velocity at which each of the examples was tested, are reported in TABLE II.

FIG. 1 is a graph illustrating the relation between the %NOx conversion and use temperature of the catalyst of Example 1. An examination of the figure reveals that a maximum %NOx conversion of about 80% is reached a temperature of approximately 400° C., while the conversion temperature range is between about 200 to 550° C.

Comparative Example 6 and 7

Catalyst Preparation

Catalyst batches for each of the catalyst examples 6–7 were prepared in the in a similar manner as detailed above.

A ZSM-5 zeolite (silica/alumina ratio of 30/1) was prepared in a conventional manner; a zeolite exhibiting a 80/20, by weight, zeolite/silica composition. Copper was ion exchanged into the zeolite in a procedure involving the formation of a dilute copper acetate solution (1.6% Cu) into which the zeolite material was added. The solution was thereafter mixed, at ambient temperature for a period of about 12 hours. The Cu-impregnated zeolite was removed from the solution via a filtration technique and thereafter rinsed with deionized water several times. The rinsed Cu-impregnated zeolite was then dried overnight in a dielectric oven at a temperature of 110° C.

For the example 6 catalyst, the Cu-impregnated zeolite powder is then, as described above, combined with 48 grams of a methylcellulose temporary binder (Methocel A4M from the Dow Chemical Co.) and mixed in a Littleford dry blender after treatment with 2%, by weight acetic acid (Aldrich Chemical Company Inc.). The mixed batch then was transferred to a muller and 350 (40%, by weight) milliliters of water was added to the batch to uniformly plasticize the batch.

The formation of the Example 7 catalyst involved washcoating, via standard procedures, onto a standard cordierite honeycomb substrate a 48% Cu-impregnated zeolite slurry.

Cu-impregnated honeycomb catalyst bodies of the same dimensions as above were formed in the manner as described above for Examples 1–5. The compositions of the fired honeycomb catalysts of Examples 6–7 are reported in Table I.

Catalytic Activity Testing Procedure

The extruded honeycomb zeolite-Cu catalysts were tested for catalytic activity by utilizing the same procedure as mentioned above for the C-Ni impregnated zeolite catalyst honeycombs, with the results also shown in TABLE II.

TABLE I

|  | 1 sn2340 | 2 ftir79 | 3 ftir76 | 4 ftir72 | 5 ftr99 | 6* ftr4098 | 7* ftr88 |
|---|---|---|---|---|---|---|---|
| Batch Mixture (Grams) | | | | | | | |
| Zeolite | 640 | 640 | 640 | 640 | 640 | 640 | 640 |
| Silicone Resin | 465.1 | 465.1 | 465.1 | 465.1 | 465.1 | 465.1 | 465.1 |
| Temporary Binder | 48 | 48 | 48 | 48 | 48 | 48 | 48 |
| Water (%) | 40 | 40 | 40 | 40 | 40 | 40 | 40 |
| Aged (y/n) | | | | Y | | | Y |
| Metal (%) | | | | | | | |
| Ni | 1.5 | 1.5 | 1.5 | 1.5 | 1.5 | | |
| Co | 1.5 | 1.5 | 1.5 | 1.5 | 1.5 | | |
| Cu | | | | | | 1.5 | 1.5 |
| Fired Composition (%) | | | | | | | |
| Zeolite/Silica | 97 | 97 | 97 | 97 | 97 | | |
| Ni | 1.5 | 1.5 | 1.5 | 1.5 | 1.5 | | |
| Co | 1.5 | 1.5 | 1.5 | 1.5 | 1.5 | | |
| Cu | | | | | | | |

*Comparison Examples

TABLE II

|  | 1 | 2 | 3 | 4 | 5 | 6* | 7* |
|---|---|---|---|---|---|---|---|
| Space Velocity (h$^{-1}$) | 5000 | 20000 | 20000 | 20000 | 10000 | 20000 | 20000 |
| Water | Y |  | Y | Y | Y | Y | Y |
| Max NO$_x$ → N$_2$ (%) | 80 | 70 | 30 | 18–20 | 38 | — | 30 |
| NO$_2$ (%) | — | — | 25 | 30–40 | 38 | 25–30 | — |
| Max Temp Range (° C.) | 200–550 | 400–525 | 400–525 | 400–525 | 200–600 | 300–450 | 525 |

Examples 8 and 9

Figure 2:
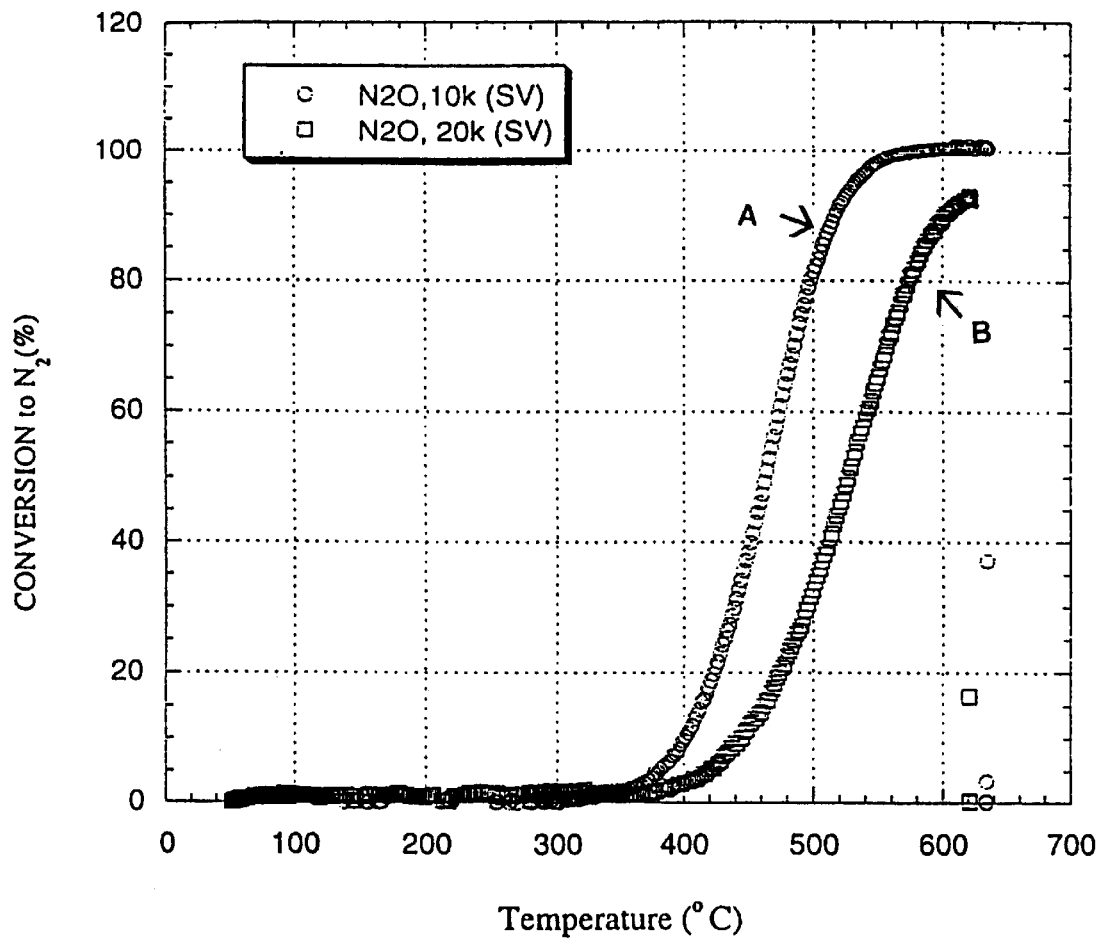
FIG. 2 is a graph illustrating a relation between the Conversion to $N_2$% and use temperature of the catalyst of Examples 8 and 9.

Two honeycomb catalysts were formed and catalytically tested in a manner as described above for Examples 1–5. Example 8 and 9 were subjected to the simulated exhaust gas mixture at a space velocities of 10,000 and 20,000 h$^{-1}$, respectively. The results were plotted and are reported in FIG. 2. An examination of FIG. 2 reveals that the Example 8 honeycomb catalyst, designated plot A exhibits a 100% conversion to N$_2$ between about 550 to 600° C. The Example 9 honeycomb catalyst began to exhibit appreciable conversions (>40%) of N$_2$, at 500° C. and reached a maximum conversion of approximately 90% at about 600° C.

It should be understood that while the present invention has been described in detail with respect to certain illustrative and specific embodiments thereof, it should not be considered limited to such, as numerous modifications are possible without departing from the broad spirit and scope of the present invention as defined in the appended claims.

We claim:

1. A catalyst for purifying an exhaust gas to remove nitrogen oxides, carbon monoxide and hydrocarbons from exhaust gas consisting of an extruded zeolite-based composite honeycomb structure having a composition comprising:
   (i) a zeolite having a silica/alumina ratio of greater than 55 and constituting at least 30% by weight of the structure;
   (ii) at least 1.5%, by weight, each of nickel and cobalt incorporated therein, and
   (iii) an adsorber component comprising a mixture of gamma alumina support and an adsorber material selected from the group consisting of strontium oxide (SrO), barium oxide (BaC), calcium oxide (GaO), cesium oxide (Cs$_2$O), lithium oxide (Li$_2$O), lanthanum oxide (La$_2$O$_3$), potassium oxide (K$_2$O), magnesium oxide (MgO), manganese oxide (MnO$_2$), sodium oxide (Na$_2$O), mixtures of La$_2$O$_3$ and CeO with TiO$_2$ and ZrO$_2$, BaTiO$_3$, BaZrO$_3$, LaMnO$_x$ (x ranging from 2 to 4), BaMgCu$_2$O$_6$ and LaBaSrFe$_2$O$_6$.

2. The catalyst of claim 1, wherein the adsorber material is BaO or K$_2$O or mixtures thereof.

3. The catalyst of claim 1 wherein the adsorber material is mixed metal oxide perovskite material of either BaMgCu$_2$O$_6$ or LaBaSrFe$_2$O$_6$.

4. The catalyst of claim 1 wherein the gamma alumina support includes a stabilizing agent selected from the group consisting of lanthanum oxide, barium oxide, strontium oxide and yttrium oxide.

5. The catalyst of claim 1 wherein the catalyst exhibits a surface area of at least 200 m$^2$/g.

6. The catalyst of claim 1 wherein the catalyst exhibits a surface area of at least 300 m$^2$/g.

7. The catalyst of claim 1 wherein the extruded honeycomb structure comprises at least 400 cells/in$^2$, exhibits a modulus of rupture strength of at least 1500 psi, and contains 50–60% zeolite by weight.

8. An adsorbent/catalyst system for purifying an exhaust gas to remove nitrogen oxides, carbon monoxide and hydrocarbons from exhaust gas comprising
   (i) a zeolite having a silica/alumina ratio of greater than 55;
   (ii) at least 1.5%, by weight, each of nickel and cobalt incorporated in the zeolite; and
   (iii) an adsorber component comprising a mixture of gamma alumina support material and an adsorber material consisting of a mixed metal oxide perovskite material of either BaMgCu$_2$O$_6$ or LaBaSrFe$_2$O$_6$.

* * * * *

UNITED STATES PATENT AND TRADEMARK OFFICE
CERTIFICATE OF CORRECTION

PATENT NO. : 6,555,492 B2  Page 1 of 1
DATED : April 29, 2003
INVENTOR(S) : Faber et al.

It is certified that error appears in the above-identified patent and that said Letters Patent is hereby corrected as shown below:

Column 5,
Line 19, "(GaO)" should be -- (CaO) --

Column 9,
Line 44, "(BaC)" should be -- (BaO) --
Line 44, "(GaO)" should be -- (CaO) --

Signed and Sealed this

Fourth Day of November, 2003

JAMES E. ROGAN
*Director of the United States Patent and Trademark Office*